United States Patent
Ferranti et al.

(10) Patent No.: US 7,300,478 B2
(45) Date of Patent: Nov. 27, 2007

(54) SLURRY COMPOSITION AND METHOD OF USE

(75) Inventors: Steven A. Ferranti, Rochester, NY (US); Dana L. Zagari, Bloomfield, NY (US); LeVern G. Burm, Jr., Waterloo, NY (US); Karla Marie Goff, Waterloo, NY (US)

(73) Assignee: Ferro Corporation, Cleveland, OH (US)

( * ) Notice: Subject to any disclaimer, the term of this patent is extended or adjusted under 35 U.S.C. 154(b) by 606 days.

(21) Appl. No.: 10/444,104

(22) Filed: May 22, 2003

(65) Prior Publication Data

US 2004/0231246 A1 Nov. 25, 2004

(51) Int. Cl.
*B24B 1/00* (2006.01)
*C09G 1/02* (2006.01)

(52) U.S. Cl. ............. 51/298; 51/302; 51/303; 51/307; 51/309; 451/41; 106/3; 106/5

(58) Field of Classification Search ............... 51/298, 51/302, 303, 307, 309; 106/3, 5; 451/41
See application file for complete search history.

(56) References Cited

U.S. PATENT DOCUMENTS

| | | | |
|---|---|---|---|
| 2,625,514 A * | 1/1953 | Kirschenbauer | 510/395 |
| 4,222,747 A | 9/1980 | Dauguet et al. | |
| 5,000,761 A * | 3/1991 | Mayton et al. | 51/295 |
| 5,026,421 A | 6/1991 | Le Loarer et al. | |
| 5,266,088 A | 11/1993 | Sandusky et al. | |
| 5,286,405 A | 2/1994 | Rennie et al. | |
| 5,382,272 A | 1/1995 | Cook et al. | |
| 5,391,258 A | 2/1995 | Brancaleoni et al. | |
| 5,476,606 A | 12/1995 | Brancaleoni et al. | |
| 5,532,307 A | 7/1996 | Bogan, Jr. | |
| 5,639,296 A | 6/1997 | Garino | |
| 5,733,819 A | 3/1998 | Kodama et al. | |
| 5,861,055 A | 1/1999 | Allman et al. | |
| 5,876,490 A | 3/1999 | Ronay | |
| 6,221,119 B1 | 4/2001 | Homola | |
| 6,248,143 B1 | 6/2001 | Masuda et al. | |
| 6,280,652 B1 | 8/2001 | Inoue et al. | |
| 2002/0039875 A1 | 4/2002 | Kobayashi et al. | |
| 2004/0010978 A1 * | 1/2004 | Uchino et al. | 51/307 |
| 2004/0031206 A1 * | 2/2004 | Uchino et al. | 51/307 |

FOREIGN PATENT DOCUMENTS

| | | | |
|---|---|---|---|
| JP | 2000-109804 | * | 4/2000 |
| JP | 2000109804 | | 4/2000 |
| WO | PCT/JP02/05066 | | 12/2002 |
| WO | WO 02/096999 | * | 12/2002 |

OTHER PUBLICATIONS

Clare, "Algin," Industrial Gums Polysaccharides and Their Derivatives, Third Edition, pp. 105-131, no date.
Cottrell et al., "Alginates," Handbook of Water-Soluble Gums and Resins, Chapter 2, p. 2-10 through 2-15, no date.
Ernsberger, "Attack of Glass by Chelating Agents," Journal of The American Ceramic Society, vol. 42, No. 8, pp. 373-375, Aug. 1959.
Cook, "Chemical Processes In Glass Polishing," Journal of Non-Crystalline Solids 120, 1990, pp. 152-171, no month.
Bacon et al., "Promotion of Attack on Glass and Silica by Citrate and Other Anions in Neutral Solution," Journal of The Amer. Cer. Soc., vol. 42, No. 4, Apr. 1959, pp. 199-205.
Patent Abstracts Of Japan, Publication No. 06-330025, Publication Date Nov. 29, 1994, Application No. 05-138948, six pages.

* cited by examiner

*Primary Examiner*—Michael Marcheschi
(74) *Attorney, Agent, or Firm*—Rankin, Hill, Porter & Clark LLP

(57) ABSTRACT

The present invention provides an aqueous slurry composition that comprises cerium oxide and/or cerium oxide-containing mixed rare earth oxide abrasive particles, a polyacrylate, and an agent that retards hard settling. The agent that retards hard settling is preferably a polysaccharide such as xanthan gum, microcrystalline cellulose and/or sodium alginate, the latter of which may be treated with a divalent metal salt such as calcium carbonate. The slurry composition according to the invention can be used to polish glass and glass ceramics at a high removal rate, but does not hard settle upon extended static conditions and can be easily resuspended. The present invention also provides a method of polishing a glass or glass ceramic substrate using the slurry composition.

14 Claims, No Drawings

SLURRY COMPOSITION AND METHOD OF USE

BACKGROUND OF THE INVENTION

1. Field of Invention

The present invention relates to a slurry composition for use in chemical-mechanical polishing applications and a method of using the slurry composition.

2. Description of Related Art

A variety of slurry compositions are known in the art for use in chemical-mechanical polishing glass and glass ceramic substrates. Such prior art slurry compositions generally consist of abrasive particles dispersed in deionized water and/or other liquids. Commonly utilized abrasive particles include, for example, cerium oxide, aluminum oxide, zirconium oxide, tin oxide, silicon dioxide and titanium oxide. Cerium oxide ($CeO_2$) is most commonly used because it produces a relatively high removal rate when used to polish glass and glass ceramics.

One of the drawbacks with the use of cerium oxide abrasives is that slurry compositions containing cerium oxide (D=7.65 $g/cm^3$) tend to hard settle. Hard settling describes the condition when the abrasive particles fall out the dispersion and accumulate to form a non-redispersible layer of sludge in the container or process equipment holding the slurry composition. Hard settling can result in clogged piping and other process equipment, which is highly problematic in an industrial operation.

Homola, U.S. Pat. No. 6,221,119, discloses a method of polishing glass and glass-ceramic substrates using a slurry containing cerium oxide and sodium polyacrylate. Homola teaches that adding sodium polyacrylate to an aqueous cerium oxide slurry composition tends to increase the polishing rate. However, addition of sodium polyacrylate does not improve, and in most instances, exacerbates the hard-settling condition when the slurry composition is recirculated during the polishing operation.

BRIEF SUMMARY OF THE INVENTION

The present invention provides an aqueous slurry composition that comprises cerium oxide and/or cerium oxide-containing mixed rare earth oxide abrasive particles, a polyacrylate, and an agent that retards hard settling. The agent that retards hard settling is preferably a polysaccharide such as xanthan gum, microcrystalline cellulose and/or sodium alginate, the latter of which may be treated with a divalent metal salt such as calcium carbonate. The slurry composition according to the invention can be used to polish glass and glass ceramics at a high removal rate, but does not hard settle upon extended static conditions and can be easily resuspended. The present invention also provides a method of polishing a glass or glass ceramic substrate using the slurry composition.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The slurry composition according to the present invention comprises deionized water, cerium oxide and/or cerium-containing mixed rare earth oxide abrasive particles, a polyacrylate and an agent that retards hard settling. Each of the components of the slurry composition is separately discussed below.

1. Abrasive Particles

The slurry composition preferably comprises from about 1% to about 20% by weight, and more preferably from about 7% to about 12% by weight, of abrasive particles selected from the group consisting of: (1) high purity cerium oxide abrasive particles; (2) cerium oxide-containing mixed rare earth oxide abrasive particles; and combinations thereof. Throughout the instant specification and in the appended claims, the phrase "high purity cerium oxide" refers to cerium oxide having a purity that is greater than about 90% by weight, and more preferably greater than about 98% by weight. Preferably, the high purity cerium oxide also exhibits a predominant crystal form for use in glass and glass ceramic polishing operations. High purity cerium oxide is available from a number of suppliers including 99.9% cerium oxide powder supplied by Ferro Corporation, Ferro Electronic Material Systems Division, Penn Yan, N.Y.

As noted above, cerium oxide-containing mixed rare earth oxides can also be used alone or in combination with high purity cerium oxide abrasive particles, provided that the amount by weight of cerium oxide ($CeO_2$) as a percent of the total rare earth oxides (TREO) in the mixed rare earth oxide is greater than or equal to 50% ($CeO_2$/TREO$\geq$50%). A suitable cerium oxide-containing mixed rare earth oxide for use in the invention can be obtained from Ferro Corporation, Ferro Electronic Material Systems Division, Penn Yan, N.Y.

Regardless of their composition, the abrasive particles used in the slurry composition according to the invention preferably have an average particle size (diameter) of from about 0.1 μm to about 7.0 μm. More preferably, the abrasive particles have an average particle size within the range of from about 0.15 μm to about 4.0 μm.

2. Polyacrylate

The slurry composition preferably comprises one or more polyacrylates in an amount within the range of from about 0.5% to about 10% by weight of the total solids (e.g., the abrasive particles, polyacrylates, suspension agents) present in the slurry composition. More preferably, slurry composition preferably comprises one or more polyacrylates in an amount within the range of from about 3% to about 6% by weight of the total solids present in the slurry composition.

The polyacrylates used in the slurry composition preferably have a number average molecular weight within the range of from about 2,000 to about 90,000. More preferably, the polyacrylates present in the composition have a number average molecular weight within the range of from about 4,000 to about 10,000.

Suitable polyacrylates for use in the invention include, can be obtained from suppliers such as Aldrich Chemicals, Milwaulkee, Wis., and ACROS Organics and Fine Chemicals, Pittsburg, Pa. Polyacrylic acids of molecular weight 4500 (CRITERION 2005) and 8000 (CRITERION 2108) can be purchased from Kemira Chemicals, Kennesaw, Ga. In the presently most preferred embodiment of the invention, the polyacrylate comprises ACUSOL 445, a polyacrylic acid with a molecular weight of 4500 manufactured by Rohm and Haas, Philadelphia, Pa.

3. Agent that Retards Hard Settling

Most conventional chemical-mechanical polishing machines recirculate the slurry composition through pipes for reuse. When polishing conditions are severe (e.g., high velocity, high pressure, extended polishing times, etc.), the abrasive particles in the slurry composition can undergo mechanical wear including fracturing of agglomerates, which results in a decrease in the size of the initial agglomerates. The slurry also typically becomes contaminated with exogenous materials such as silicates that are removed from the glass and/or glass substrate being polished. During extended polishing machine shutdowns, the combination of the preceding factors result in the slurry product settling into the piping and in the reservoirs forming a gum-like sludge. Resuspension of the gum-like sludge can be difficult, but is usually possible.

As previously noted above, it has been found that the addition of a polyacrylate to a slurry composition comprising cerium oxide abrasive particles tends to increase the rate at which the slurry composition polishes glass and/or glass ceramic substrates. However, the addition of a polyacrylate makes the settling problem worse, transforming the gum-like sludge into a hard, intractable cake that is virtually impossible to resuspend under normal operating conditions. This onset of hard settling makes the use of a polyacrylate impractical in normal polishing operations.

Applicants have discovered that it is possible to include one or more polyacrylates in a slurry composition to obtain the desired increased polishing rate while avoiding or retarding hard settling by including an agent in the slurry composition that retards hard settling. The agent which retards hard settling is preferably a polysaccharide, which may be in pure form or may be mixed with other substances either as part of the polymer or blended with the polysaccharide (i.e., polysaccharide-containing materials). Some presently preferred agents that retard hard settling are natural and synthetic water-soluble gums and their salts such as, for example, gum agar, guar gum, gum arabic, sodium alginate, dextrans, xanthan gum, tragacanth gum, carrageenan, and locust been gum, and cellulose ethers, esters and their salts, including, for example, microcrystalline cellulose, hydroxy hydrocarbyl cellulose, hydrocarbylhydroxy cellulose, hydroxyethyl cellulose, carboxyethyl cellulose, hydroxypropyl cellulose and hydroxypropyl methyl cellulose. Mixtures of two or more of any such agents can also be used.

The presently most preferred agents that retard hard settling for use in the invention are microcrystalline cellulose, xanthan gum and sodium alginate. When sodium alginate is used, it is preferable that the slurry composition also further comprise one or more divalent metal salts. Calcium salts such as, for example, $CaCl_2$, $CaCO_3$, $CaO$, $CaBr_2$ and $CaSO_4$ are preferred.

The slurry composition preferably comprises one or more agents that retard hard settling in an amount within the range of from about 0.1% to about 10% by weight of the total solids (e.g., the abrasive particles, polyacrylates, suspension agents) present in the slurry composition. More preferably, slurry composition preferably comprises one or more agents that retard hard settling in an amount within the range of from about 0.3% to about 6.5% by weight of the total solids present in the slurry composition.

Slurry compositions according to the invention do not hard settle, but rather such compositions tend to form a resuspendable sediment after long static periods (typically in excess of 24 hours). Throughout the instant specification and in the appended claims, the term "resuspendable sediment" means that the abrasive particles and other solids in the slurry composition that settle out into a sediment after 24 hours can be resuspended for use simply by normal agitation, i.e. mechanical stirring.

The method according to the present invention comprises introducing a slurry composition between a polishing pad and a glass or glass ceramic substrate that are pressed into contact and moving relative to each other, wherein the slurry composition comprises deionized water, cerium oxide and/or cerium-containing mixed rare earth oxide abrasive particles, a polyacrylate and an agent that retards hard settling. The method of the invention can be used to planarize glass and glass ceramic substrates used for electronic glass applications. Typical applications include the fabrication of amorphous glass memory disks, glass and glass ceramic memory disks, and all types of liquid crystal display (LCD) glass substrates.

The following examples are intended only to illustrate the invention and should not be construed as imposing limitations upon the claims.

EXAMPLE 1

Slurry Compositions A (Control), B and C were formulated as shown in weight percent in Table 1 below:

TABLE 1

|  | Slurry A | Slurry B | Slurry C |
| --- | --- | --- | --- |
| Deionized $H_2O$ | 90.00 | 89.63 | 89.84 |
| $CeO_2$[a] | 10.00 | 9.90 | 9.78 |
| Polyacrylate[b] | — | 0.47 | 0.30 |
| Xanthan Gum[c] | — | — | 0.08 |
| Total | 100.00 | 100.00 | 100.00 |

[a] 99% purity ceria, (average particle size 0.15 to 4.0 microns) sold by Ferro Corp.
[b] ACUSOL ® 445 (acrylic homopolymer) sold by Rohm & Haas.
[c] XAN-100 (xanthan gum) sold by AEP Colloids, Inc.

Slurry Compositions A, B and C were separately used to polish two sets of five 95 mm amorphous glass memory disk substrates using a Spitfire 360 polishing machine. The polishing parameters/conditions used in each case are shown below:

| | |
| --- | --- |
| Polishing Pad: | Rhodes LP66 Polyurethane Pad |
| Lap Speed: | 30/10/30 rpm |
| Sample Pressure: | 1.0 psi |
| Slurry Flow-Rate: | 300 ml/min |
| Polishing Slurry: | Recirculated |
| Pad Conditioning Cycle Time: | 8.0 minutes |
| Polishing Cycle Time: | 8.0 minutes |

In each case, a 100 ml sample of the used Slurry Composition was transferred to a graduated cylinder and allowed to settle for 24 hours. Analytical results are shown in Table 2 below:

TABLE 2

|  | Slurry A | Slurry B | Slurry C |
| --- | --- | --- | --- |
| Removal Rate (µ/min) | 1.20 | 1.27 | 1.32 |
| Removal Rate (% of Control) | 100 | 106 | 110 |
| Resuspendable after 24 Hours | NO | NO | YES |

Slurry Composition B, which also contained polyacrylate, provided a 6% increase in stock removal rate as compared to Slurry Composition A (Control), which contained cerium oxide (>99%) and deionized water only. However, used Slurry Composition B hard settled and was not resuspendable after 24 hours. Slurry Composition C, which further contained xanthan gum in addition to polyacrylate, cerium oxide (>99%) and deionized water, provided a 10% increase in stock removal rate as compared to Slurry Composition A (Control). Furthermore, Slurry Composition C did not hard settle and was resuspendable after 24 hours.

EXAMPLE 2

Slurry Compositions D (Control), E and F were formulated as shown in weight percent in Table 3 below:

TABLE 3

|  | Slurry D | Slurry E | Slurry F |
| --- | --- | --- | --- |
| Deionized H$_2$O | 90.00 | 89.63 | 90.00 |
| Mixed Rare Earth Oxide[d] | 10.00 | 9.90 | 9.52 |
| Polyacrylate[e] | — | 0.47 | 0.40 |
| Microcrystalline Cellulose[f] | — | — | 0.08 |
| Total | 100.00 | 100.00 | 100.00 |

[d]CeO$_2$/Total Rare Earth Oxide = >50%, average particle size 0.15 to 4.0 microns) sold by Ferro Corp.
[e]ACUSOL ® 445 (acrylic homopolymer) sold by Rohm & Haas.
[f]LATTICE ® NT-020 sold by FMC Corporation.

Slurry Compositions D, E and F were separately used to polish two sets of five 95 mm amorphous glass memory disk substrates using a Spitfire 360 polishing machine. The polishing parameters/conditions were the same as used in Example 1. In each case, a 100 ml sample of the used Slurry Composition was transferred to a graduated cylinder and allowed to settle for 24 hours. Analytical results are shown in Table 4 below:

TABLE 4

|  | Slurry D | Slurry E | Slurry F |
| --- | --- | --- | --- |
| Removal Rate (μ/min) | 1.08 | 1.34 | 1.35 |
| Removal Rate (% of Control) | 100 | 124 | 125 |
| Resuspendable after 24 Hours | NO | NO | YES |

Slurry Composition E, which also contained polyacrylate, provided a 24% increase in stock removal rate as compared to Slurry Composition D (Control), which contained mixed Rare Earth oxide abrasives and deionized water only. However, used Slurry Composition E hard settled and was not resuspendable after 24 hours. Slurry Composition F, which further contained microcrystalline cellulose in addition to polyacrylate, mixed Rare Earth oxide abrasives and deionized water, provided a 25% increase in stock removal rate as compared to Slurry Composition D (Control). Furthermore, Slurry Composition F did not hard settle and was resuspendable after 24 hours.

Example 2 shows that addition of polyacrylate to a slurry composition also improves the polishing rate when abrasive particles other than high purity cerium oxide are used. Mixed rare earth oxides containing cerium oxide levels as low as 50% have also shown significant increase in stock removal rate when treated with polyacrylate. However the resultant used polishing slurries hard settle making them impossible to resuspend unless a thickening agent, such as naturally derived cellulose polymers for example, are also included in the slurry composition.

EXAMPLE 3

Slurry Compositions G (Control), H and I were formulated as shown in weight percent in Table 5 below:

TABLE 5

|  | Slurry G | Slurry H | Slurry I |
| --- | --- | --- | --- |
| Deionized H$_2$O | 90.00 | 89.63 | 90.00 |
| Mixed Rare Earth Oxide[g] | 10.00 | 9.90 | 9.30 |
| Polyacrylate[h] | — | 0.47 | 0.40 |
| Sodium Alginate[i] | — | — | 0.25 |
| CaCO$_3$[j] | — | — | .05 |
| Total | 100.00 | 100.00 | 100.00 |

[g](CeO$_2$/Total Rare Earth Oxide = >50%, average particle size 0.15 to 4.0 microns, sold by Ferro Corp.
[h]ACUSOL ® 445 (acrylic homopolymer) sold by Rohm & Haas.
[i]Sodium Alginate LTV sold by AEP Colloids, Inc.
[j]HYDROCARB-OG, sold by OMYA, Inc.

Slurry Compositions G, H and I were separately used to polish two sets of five 95 mm amorphous glass memory disk substrates using a Spitfire 360 polishing machine. The polishing parameters/conditions were the same as used in Example 1. In each case, a 100 ml sample of the used Slurry Composition was transferred to a graduated cylinder and allowed to settle for 24 hours. Analytical results are shown in Table 6 below:

TABLE 6

|  | Slurry G | Slurry H | Slurry I |
| --- | --- | --- | --- |
| Removal Rate (μ/min) | 1.20 | 1.42 | 1.35 |
| Removal Rate (% of Control) | 100 | 118 | 113 |
| Resuspendable after 24 Hours | NO | NO | YES |

Slurry Composition H, which also contained polyacrylate, provided an 18% increase in stock removal rate as compared to Slurry Composition G (Control), which contained mixed Rare Earth oxide abrasives and deionized water only. However, used Slurry Composition H hard settled and was not resuspendable after 24 hours. Slurry Composition I, which further contained sodium alginate and a calcium salt in addition to polyacrylate, mixed Rare Earth oxide abrasives and deionized water, provided a 13% increase in stock removal rate as compared to Slurry Composition G (Control). Furthermore, Slurry Composition I did not hard settle and was resuspendable after 4 days (96 hours). The calcium salt is believed to enhance the soft-settling characteristic of the slurry composition.

EXAMPLE 4

Slurry Compositions J (Control), K, L, M, N and O were formulated as shown in weight percent in Table 7 below:

TABLE 7

|  | Slurry J | Slurry K | Slurry L | Slurry M | Slurry N | Slurry O |
|---|---|---|---|---|---|---|
| Deionized H$_2$O | 95.00 | 95.00 | 95.00 | 95.00 | 95.00 | 95.00 |
| Abrasive Particles[k] | 5.00 | 4.8 | 4.6 | 4.5875 | — | — |
| Abrasive Particles[l] | — | — | — | — | 4.63 | — |
| Abrasive Particles[m] | — | — | — | — | — | 5.0 |
| Polyacrylate[n] | — | 0.20 | 0.20 | 0.20 | 0.20 | — |
| Sodium Alginate[o] | — | — | 0.20 | 0.20 | 0.15 | — |
| CaO[p] | — | — | — | 0.0125 | 0.02 | — |
| Total | 100.00 | 100.00 | 100.00 | 100.00 | 100.00 | 100.00 |

[k](CeO$_2$/Total Rare Earth Oxide = >50%, avg. particle size 0.15 to 4.0 microns, sold by Ferro Corp.
[l](CeO$_2$/Total Rare Earth Oxide = >80%, avg. particle size 0.15 to 4.0 microns, sold by Ferro Corp.
[m]MIREK ® E-20 Rare-earth oxide polish sold by Mitsui Mining & Smelting.
[n]ACUSOL ® 445 (acrylic homopolymer) sold by Rohm & Haas.
[o]Sodium Alginate LTV sold by AEP Colloids, Inc.
(p) - CaO, sold by Bellefonte Lime Company, Inc. Bellefonte, PA.

Slurry Compositions J, K, L, M, N and O were separately used to polish STN type LCD glass substrates (3×3 inches square) using a Strausbaugh 6DE-1 single sided polisher. The polishing parameters/conditions used in each case are shown below:

| Sample Pressure: | 1.8 psi |
| Spindle: | 90 rpm |
| Eccentric: | 25 rpm |
| Polishing Pad: | Rodel MHC-14B Polyurethane Pad |
| Slurry: | 1200 grams |
| Slurry Flow-Rate: | >250 ml/min |
| Polishing Slurry: | Recirculated |

The LCD glass substrates were polished for a minimum of 30 minutes. Removal measurements were taken every ten minutes. In each case, a 100 ml sample of the used Slurry Composition was transferred to a graduated cylinder and allowed to settle for 24 hours. Analytical results are shown in Table 8 below:

TABLE 8

|  | Slurry J | Slurry K | Slurry L | Slurry M | Slurry N | Slurry O |
|---|---|---|---|---|---|---|
| Removal Rate (mg/10 min.) | 48 | 66 | 65 | 67 | 65 | 47 |
| Removal Rate (% of Control) | 100 | 138 | 136 | 140 | 136 | 98 |
| Resuspendable after 24 Hours | NO | NO | NO | YES | YES | YES |

Example 4 demonstrates that the use of sodium alginate in combination with a calcium salt in an aqueous slurry comprised of mixed rare earth oxide abrasive particles and polyacrylate enhances the soft-settling characteristics of used polishing slurry. A slurry composition comprising these components can stay redispersable for more than 48 hours after the slurry composition is in a static state. Example 4 further shows that the combination of polyacrylate, sodium alginate and a calcium salt provides a substantial increase in stock removal rate versus a slurry comprising untreated mixed rare earth oxide abrasives and deionized water. Slurry Composition N shows that a cerium/lanthanum oxide mixed rare earth oxide abrasive (CeO$_2$/Total Rare Earth Oxide >80%) also exhibit significantly increased removal and excellent soft settling properties when the polyacrylate, sodium alginate, and calcium salt combination are used. Slurry Composition O, which is a known slurry composition, is included for purposes of comparison.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of polishing a glass or glass-ceramic substrate comprising introducing an aqueous slurry composition between a polishing pad and the substrate when the polishing pad and substrate are pressed into contact with each other and moving relative to each other, wherein the aqueous slurry composition comprises from about 1% to about 20% by weight of a solids portion comprising:
   abrasive particles, the abrasive particles comprising high purity cerium oxide and/or cerium-containing mixed rare earth oxides, provided that the amount by weight of cerium oxide present as a percent of the total rare earth oxide is greater than or equal to 50%;
   a polyacrylate in an amount within the range of from about 0.5% to about 10% by weight of the solids portion;
   sodium alginate in an amount within the range of from about 0.1% to about 10% by weight of the solids portion; and
   CaCO$_3$,
wherein the slurry is redispersible after remaining in a static state for a period of greater than about 24 hours.

2. The method according to claim 1 wherein the slurry composition is redispersible after remaining in a static state for a period of greater than about 48 hours.

3. The method of claim 1 wherein the polyacrylate has a number average molecular weight of about 2,000 to about 90,000.

4. The method of claim 1 wherein the abrasive particles have an average particle size of about 0.1 μm to about 7.0 μm.

5. The method of claim 1 wherein the polyacrylate has a molecular weight of about 4,000 to about 10,000.

6. A method of polishing a glass or glass-ceramic substrate comprising introducing an aqueous slurry composition between a polishing pad and the substrate when the polishing pad and substrate are pressed into contact with each other and moving relative to each other, wherein the aqueous slurry composition comprises deionized water and from about 1% to about 20% by weight of a solids portion comprising:

abrasive particles, the abrasive particles comprising high purity cerium oxide and/or cerium-containing mixed rare earth oxides, provided that the amount by weight of cerium oxide present as a percent of the total rare earth oxide is greater than or equal to 50%;

an acrylic homopolymer having a number average molecular weight of about 2,000 to about 90,000 in an amount of about 0.5% to about 10% by weight of the solids portion;

sodium alginate in an amount of about 0.3% to about 6.5% by weight of the solids portion; and $CaCO_3$, wherein the slurry is redispersible after remaining in a static state for a period of greater than about 24 hours.

7. The method of claim 6, wherein the amount by weight of cerium oxide present in the cerium-containing mixed rare earth oxide as a percent of the total rare earth oxides is greater than or equal to 80%.

8. The method of claim 6 wherein the abrasive particles have an average particle size of about 0.1 μm to about 7.0 μm.

9. A method of polishing a glass or glass-ceramic substrate comprising introducing an aqueous slurry composition between a polishing pad and the substrate when the polishing pad and substrate are pressed into contact with each other and moving relative to each other, wherein the aqueous slurry composition comprises deionized water and from about 7% to about 12% by weight of a solids portion comprising:

abrasive particles, the abrasive particles comprising high purity cerium oxide and/or cerium-containing mixed rare earth oxides, provided that the amount by weight of cerium oxide present as a percent of the total rare earth oxide is greater than or equal to 50%;

an acrylic homopolymer having a number average molecular weight of about 2,000 to about 90,000 in an amount of about 0.5% to about 10% by weight of the solids portion;

sodium alginate in an amount of about 0.3% to about 6.5% by weight of the solids portion; and $CaCO_3$, wherein the slurry is redispersible after remaining in a static state for a period of greater than about 24 hours.

10. The method of claim 9 wherein the amount by weight of cerium oxide present in the cerium-containing mixed rare earth oxide as a percent of the total rare earth oxides is greater than or equal to 80%.

11. The method of claim 9 wherein the abrasive particles have an average particle size of about 0.1 μm to about 7.0 μm.

12. A method of polishing a glass or glass-ceramic substrate comprising introducing an aqueous slurry composition between a polishing pad and the substrate when the polishing pad and substrate are pressed into contact with each other and moving relative to each other, wherein the aqueous slurry composition comprises deionized water and from about 7% to about 12% by weight of a solids portion comprising:

abrasive particles, the abrasive particles comprising high purity cerium oxide and/or cerium-containing mixed rare earth oxides, provided that the amount by weight of cerium oxide present as a percent of the total rare earth oxide is greater than or equal to 50%;

an acrylic homopolymer having a number average molecular weight within the range of from about 4,000 to about 10,000 in amount within the range of from about 3% to about 6% by weight of the solids portion;

sodium alginate in an amount within the range of from about 0.3% to about 6.5% by weight of the solids portion; and $CaCO_3$, wherein the slurry is redispersible after remaining in a static state for a period of greater than about 24 hours.

13. The method of claim 12 wherein the abrasive particles have an average particle size of about 0.1 μm to about 7.0 μm.

14. A method of polishing a glass or glass-ceramic substrate comprising introducing an aqueous slurry composition between a polishing pad and the substrate when the polishing pad and substrate are pressed into contact with each other and moving relative to each other, wherein the aqueous slurry composition comprises deionized water and from about 7% to about 12% by weight of a solids portion comprising:

abrasive particles, the abrasive particles comprising cerium oxide and lanthanum oxide;

an acrylic homopolymer having a number average molecular weight within the range of from about 4,000 to about 10,000 in amount within the range of from about 3% to about 6% by weight of the solids portion;

sodium alginate in an amount within the range of from about 0.3% to about 6.5% by weight of the solids portion; and $CaCO_3$, wherein the slurry is redispersible after remaining in a static state for a period of greater than about 24 hours.

* * * * *